US006444774B1

(12) United States Patent
Stahl et al.

(10) Patent No.: US 6,444,774 B1
(45) Date of Patent: **\*Sep. 3, 2002**

(54) PROPYLENE POLYMERS FOR FIBERS AND FABRICS

(75) Inventors: G. Allan Stahl, Humble; Galen C. Richeson, Kingwood, both of TX (US)

(73) Assignee: ExxonMobil Chemical Patents, Inc., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 20 days.

(21) Appl. No.: 09/162,909

(22) Filed: Sep. 29, 1998

Related U.S. Application Data

(60) Provisional application No. 60/061,612, filed on Oct. 10, 1997.

(51) Int. Cl.$^7$ .................. C08F 10/06; C08F 110/06; D04H 1/56
(52) U.S. Cl. .................. 526/351; 526/65; 526/160; 526/348.6; 526/943; 442/401; 442/407; 525/240
(58) Field of Search .................. 526/351, 160, 526/348.6, 943, 65; 428/400, 401, 402; 525/240; 442/401, 407

(56) References Cited

U.S. PATENT DOCUMENTS

| 5,637,666 | A | 6/1997 | Winter et al. ............... 526/351 |
| 5,736,465 | A | 4/1998 | Stahl et al. .................. 428/298 |
| 5,891,814 | A | * 4/1999 | Richeson et al. ........... 442/401 |

FOREIGN PATENT DOCUMENTS

| WO | WO-94/28219 | * 12/1994 | |
| WO | WO 95 20708 | 11/1995 | |
| WO | WO9530708 | 11/1995 | .............. C08J/5/18 |
| WO | WO 95 32091 | 11/1995 | |
| WO | WO 98/10016 | * 3/1998 | |
| WO | WO98/10016 | 3/1998 | |

\* cited by examiner

*Primary Examiner*—Donald R. Wilson
*Assistant Examiner*—R. Harlan
(74) *Attorney, Agent, or Firm*—Paige Schmidt; Kevin M. Faulkner; Douglas W. Miller

(57) ABSTRACT

This invention relates generally to fibers and fabrics prepared using crystalline propylene polymer compositions comprising both propylene homopolymer and propylene copolymer. The propylene polymer compositions are prepared using at least one metallocene catalyst system in a polymerization process that involves the initial homopolymerization of propylene followed by the copolymerization of propylene with a small amount of comonomer. Fibers prepared with these propylene polymers are significantly more elastic and fabrics prepared with these polymers have a significantly broader bonding window which allows for more easy processing compared to fibers and fabrics prepared from known propylene polymers.

18 Claims, No Drawings

PROPYLENE POLYMERS FOR FIBERS AND FABRICS

APPLICATION FOR UNITED STATES PATENT

Based on Provisional Application No. 60/061,612, filed Oct. 10, 1997.

FIELD OF THE INVENTION

This invention relates generally to fibers and fabrics prepared from crystalline propylene polymer compositions comprising both propylene homopolymer and propylene copolymer components. Preferably the propylene polymer composition is isotactic. The compositions are prepared using metallocene catalyst systems in a polymerization process that involves the sequential or parallel polymerization of propylene homopolymer and copolymer using propylene with a small amount of comonomer, preferably ethylene. The resulting polymer compositions are excellent for use in the production of fibers and fabrics. Fibers prepared with these propylene polymers are substantially more elastic, and fabrics prepared with these polymers are stronger, softer have a higher elongation and have a significantly broader and lower bonding window at lower temperatures compared to fibers and fabrics prepared from known propylene-based polymers. The broader bonding window is especially advantageous when bonding heavy basis weight fabrics.

BACKGROUND

Propylene polymer fibers and fabrics are widely used in many applications including twine, carpet, medical gowns and drapes, and diapers. The optimization of processing characteristics and properties of propylene based fibers and fabrics has been the subject of intense effort. For example, WO 94/28219 and U.S. Pat. No. 5,637,666 describe fibers and fabrics prepared from metallocene catalyzed isotactic polypropylene. These fibers are significantly stronger compared to fibers prepared with Ziegler-Natta catalyzed isotactic polypropylene.

The present inventors have discovered that crystalline propylene polymer compositions made by polymerizing propylene in one stage and then propylene and a minor amount of comonomer in a separate stage using a metallocene catalyst system results in polymers which impart improved elasticity, strength, and processing characteristics when used to make fibers and fabrics.

Multiple stage polymerization processes are known in the art and are usually used to prepare block copolymers which contain rubbery materials as opposed to the crystalline polymers of this invention. U.S. Pat. Nos. 5,280,074; 5,322,902, and 5,346,925, for example, describe two-stage processes for producing propylene block copolymers. The propylene/ethylene copolymer portion of these compositions is a non-crystalline, rubbery material suitable for molding applications rather than fibers and fabrics.

SUMMARY

This invention is directed toward a fiber comprising a crystalline propylene polymer composition comprising: a) from about 10 to about 90 weight percent crystalline, isotactic propylene homopolymer having a molecular weight distribution of less than about 3; and b) from about 90 to about 10 weight percent crystalline propylene copolymer having a molecular weight distribution of less than about 3, wherein the weight percent of the comonomer based on the total weight of the polymer is in the range of from about 0.05 to about 15.

This invention is also directed toward a fabric comprising a crystalline propylene polymer composition comprising: a) from about 10 to about 90 weight percent crystalline, isotactic propylene homopolymer having a molecular weight distribution of less than about 3; and b) from about 90 to about 10 weight percent crystalline propylene copolymer having a molecular weight distribution of less than about 3, wherein the weight percent of the comonomer based on the total weight of the polymer is in the range of from about 0.05 to about 15.

DETAILED DESCRIPTION

As used herein "crystalline" is defined as having one or more identifiable peak melting points above about 100° C. as determined by Differential Scanning Calorimetry (DSC peak melting temperatures).

As used herein, "isotactic" is defined as having at least 40% isotactic pentads according to analysis by $^{13}$C-NMR. As used herein, "highly isotactic" is defined as having at least 60% isotactic pentads according to analysis by $^{13}$C-NMR.

As used herein, "molecular weight" means weight average molecular weight (Mw) and "molecular weight distribution," (MWD), means Mw divided by number average molecular weight (Mn).

As used herein, unless differentiated, "polymerization" includes copolymerization and terpolymerization, "monomer" includes comonomer and termonomer, and "polymer" includes copolymer and terpolymer.

As used herein the term "fabric" includes woven fabrics, nonwoven fabrics, such as spunbond and meltblown fabrics, composite fabrics and fabric laminates.

Methods for Making Crystalline Propylene Polymer Compositions

The methods of this invention involve the use of metallocene catalyst systems that comprise at least one metallocene and at least one activator. Preferably, these catalyst system components are supported on a support material.

Metallocenes

As used herein "metallocene" refers generally to compounds represented by the formula $Cp_mMR_nX_q$ wherein Cp is a cyclopentadienyl ring which may be substituted, or derivative thereof which may be substituted, M is a Group 4, 5, or 6 transition metal, for example titanium, zirconium, hafnium, vanadium, niobium, tantalum, chromium, molybdenum and tungsten, R is a hydrocarbyl group or hydrocarboxy group having from one to 20 carbon atoms, X is a halogen, and m=1–3, n=0–3, q=0–3, and the sum of m+n+q is equal to the oxidation state of the transition metal.

Methods for making and using metallocenes are very well known in the art. For example, metallocenes are detailed in U.S. Pat. Nos. 4,530,914; 4,542,199; 4,769,910; 4,808,561; 4,871,705; 4,933,403; 4,937,299; 5,017,714; 5,026,798; 5,057,475; 5,120,867; 5,278,119; 5,304,614; 5,324,800; 5,350,723; and 5,391,790 each fully incorporated herein by reference.

Preferred metallocenes are those represented by the formula:

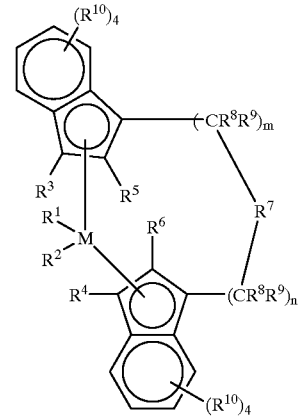

wherein M is a metal of Group 4, 5, or 6 of the Periodic Table preferably, zirconium, hafnium and titanium, most preferably zirconium;

$R^1$ and $R^2$ are identical or different, preferably identical, and are one of a hydrogen atom, a $C_1$–$C_{10}$ alkyl group, preferably a $C_1$–$C_3$ alkyl group, a $C_1$–$C_{10}$ alkoxy group, preferably a $C_1$–$C_3$ alkoxy group, a $C_6$–$C_{10}$ aryl group, preferably a $C_6$–$C_8$ aryl group, a $C_6$–$C_{10}$ aryloxy group, preferably a $C_6$–$C_8$ aryloxy group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, or a halogen atom, preferably chlorine;

$R^3$ and $R^4$ are hydrogen atoms;

$R^5$ and $R^6$ are identical or different, preferably identical, are one of a halogen atom, preferably a fluorine, chlorine or bromine atom, a $C_1$–$C_{10}$ alkyl group, preferably a $C_1$–$C_4$ alkyl group, which may be halogenated, a $C_6$–$C_{10}$ aryl group, which may be halogenated, preferably a $C_6$–$C_8$ aryl group, a $C_2$–$C_{10}$ alkenyl group, preferably a $C_2$–$C_4$ alkenyl group, a $C_7$–$C_{40}$-arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, preferably a chlorine atom, a $C_1$–$C_{10}$ alkyl group, preferably a $C_1$–$C_3$ alkyl group, or a $C_6$–$C_{10}$ aryl group, preferably a $C_6$–$C_9$ aryl group;

$R^7$ is

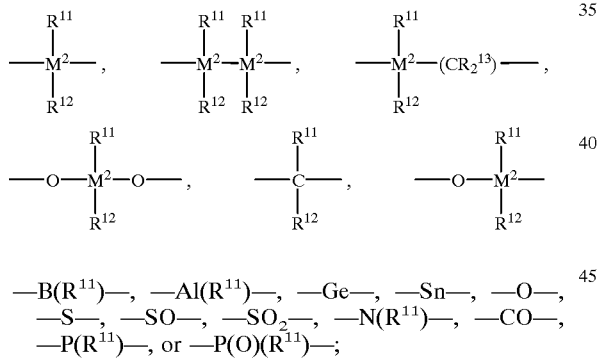

—B($R^{11}$)—, —Al($R^{11}$)—, —Ge—, —Sn—, —O—, —S—, —SO—, —$SO_2$—, —N($R^{11}$)—, —CO—, —P($R^{11}$)—, or —P(O)($R^{11}$)—;

wherein:

$R^{11}$, $R^{12}$ and $R^{13}$ are identical or different and are a hydrogen atom, a halogen atom, a $C_1$–$C_{20}$ alkyl group, preferably a $C_1$–$C_{10}$ alkyl group, a $C_1$–$C_{20}$ fluoroalkyl group, preferably a $C_1$–$C_{10}$ fluoroalkyl group, a $C_6$–$C_{30}$ aryl group, preferably a $C_6$–$C_{20}$ aryl group, a $C_6$–$C_{30}$ fluoroaryl group, preferably a $C_6$–$C_{20}$ fluoroaryl group, a $C_1$–$C_{20}$ alkoxy group, preferably a $C_1$–$C_{10}$ alkoxy group, a $C_2$–$C_{20}$ alkenyl group, preferably a $C_2$–$C_{10}$ alkenyl group, a $C_7$–$C_{40}$ arylalkyl group, preferably a $C_7$–$C_{20}$ arylalkyl group, a $C_8$–$C_{40}$ arylalkenyl group, preferably a $C_8$–$C_{22}$ arylalkenyl group, a $C_7$–$C_{40}$ alkylaryl group, preferably a $C_7$–$C_{20}$ alkylaryl group or $R^{11}$ and $R^{12}$, or $R^{11}$ and $R^{13}$, together with the atoms binding them, can form ring systems;

$M^2$ is silicon, germanium or tin, preferably silicon or germanium, most preferably silicon;

$R^8$ and $R^9$ are identical or different and have the meanings stated for $R^{11}$;

m and n are identical or different and are zero, 1 or 2, preferably zero or 1, m plus n being zero, 1 or 2, preferably zero or 1; and the radicals $R^{10}$ are identical or different and have the meanings stated for $R^{11}$, $R^{12}$ and $R^{13}$. Two adjacent $R^{10}$ radicals can be joined together to form a ring system, preferably a ring system containing from about 4–6 carbon atoms.

Alkyl refers to straight or branched chain substituents. Halogen (halogenated) refers to fluorine, chlorine, bromine or iodine atoms, preferably fluorine or chlorine.

Particularly preferred metallocenes are compounds of the structures (A) and (B):

(A)

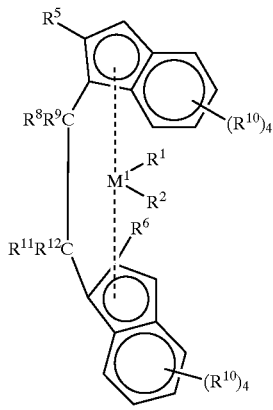

(B)

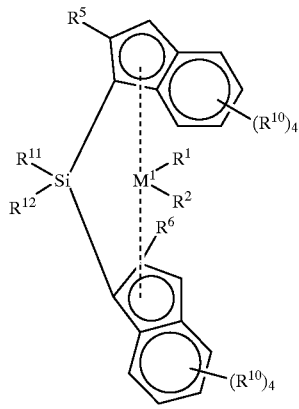

wherein:

$M^1$ is Zr or Hf, $R^1$ and $R^2$ are methyl or chlorine, and $R^5$, $R^6$ $R^8$, $R^9$, $R^{10}$, $R^{11}$ and $R^{12}$ have the above-mentioned meanings.

These chiral metallocenes may be used as a racemate for the preparation of highly isotactic polypropylene copolymers. It is also possible to use the pure R or S form. An optically active polymer can be prepared with these pure stereoisomeric forms. Preferably the meso form of the metallocene is removed to ensure the center (i.e., the metal atom) provides stereo regular polymerization. Separation of the stereoisomers can be accomplished by known literature techniques. For special products it is also possible to use rac/meso mixtures.

Additional methods for preparing metallocenes are fully described in the *Journal of Organometallic Chem.*, volume 288, (1985), pages 63–67, and in EP-A-320762, both of which are herein fully incorporated by reference.

Illustrative but non-limiting examples of preferred metallocenes include:
Dimethylsilandiylbis (2-methyl-4-phenyl-1-indenyl)ZrCl$_2$
Dimethylsilandiylbis(2-methyl-4,5-benzoindenyl)ZrCl$_2$;
Dimethylsilandiylbis(2-methyl-4,6-diisopropylindenyl) ZrCl$_2$;
Dimethylsilandiylbis(2-ethyl-4-phenyl-1-indenyl)ZrCl$_2$;
Dimethylsilandiylbis(2-ethyl-4-naphtbyl-1-indenyl)ZrCl$_2$,
Phenyl(methyl)silandiylbis(2-methyl-4-phenyl-1-indenyl) ZrCl$_2$,
Dimethylsilandiylbis(2-methyl-4-(12-naphthyl)-1-indenyl) ZrCl$_2$,
Dimethylsilandiylbis(2-methyl-4-(2-naphthyl)-1-indenyl) ZrCl$_2$,
Dimethylsilandiylbis(2-methyl-indenyl)ZrCl$_2$,
Dimethylsilandiylbis(2-methyl-4,5-diisopropyl-1-indenyl) ZrCl$_2$,
Dimethylsilandiylbis(2,4,6-trimethyl-1-indenyl)ZrCl$_2$,
Phenyl(methyl)silandiylbis(2-methyl-4,6-diisopropyl-1-indenyl)ZrCl$_2$,
1,2-Ethandiylbis(2-methyl-4,6-diisopropyl-1-indenyl) ZrCl$_2$,
1,2-Butandiylbis(2-methyl-4,6-diisopropyl-1-indenyl) ZrCl$_2$,
Dimethylsilandiylbis(2-methyl-4-ethyl-1-indenyl)ZrCl$_2$,
Dimethylsilandiylbis(2-methyl-4-isopropyl-1-indenyl) ZrCl$_2$,
Dimethylsilandiylbis(2-methyl-4-t-butyl-1-indenyl)ZrCl$_2$,
Phenyl(methyl)silandiylbis(2-methyl-4-isopropyl-1-indenyl)ZrCl$_2$,
Dimethylsilandiylbis(2-ethyl-4-methyl-1-indenyl)ZrCl$_2$,
Dimethylsilandiylbis(2,4-dimethyl-1-indenyl)ZrCl$_2$,
Dimethylsilandiylbis(2-methyl-4-ethyl-1-indenyl)ZrCl$_2$,
Dimethylsilandiylbis(2-methyl-α-acenaphth-1-indenyl) ZrCl$_2$,
Phenyl(methyl)siandiylbis(2-mehyl-ethyl-4,5-benzo-1-indenyl)ZrCl$_2$,
Phenyl(methyl)silandiylbis(2-methyl-4,5-(methylbenzo)-1-indenyl)ZrCl$_2$ ,
Phenyl(methyl)silandiylbis(2-methyl-4,5-(tetramethylbenzo)-1-indenyl)ZrCl$_2$ ,
Phenyl(methyl)silandiylbis(2-methyl-a-acenaphth-1-indenyl)ZrCl$_2$,
1,2-Ethandiylbis(2-methyl-4,5-benzo-1-indenyl)ZrCl$_2$,
1,2-Butandiylbis(2-methyl-4,5-benzo-1-indenyl)ZrCl$_2$,
Dimethylsilandiylbis(2-methyl-4,5-benzo-1-indenyl)ZrCl$_2$,
1,2-Ethandiylbis(2,4,7-trimethyl-1-indenyl)ZrCl$_2$,
Dimethylsilandiylbis(2-methyl-1-indenyl)ZrCl$_2$,
1,2-Ethandiylbis(2-methyl-1-indenyl)ZrCl$_2$,
Phenyl(methyl)silandiylbis(2-methyl-1-indenyl)ZrCl$_2$,
Diphenylsilandiylbis(2-methyl-1-indenyl)ZrCl$_2$,
1,2-Butandiylbis(2-methyl-1-indenyl)ZrCl$_2$,
Dimethylsilandiylbis(2-ethyl-1-indenyl)ZrCl$_2$,
Dimethylsilandiylbis(2-methyl-5-isobutyl-1-indenyl)ZrCl$_2$,
Phenyl(methyl)silandiylbis(2-methyl-5-isobutyl-1-indenyl) ZrCl$_2$,
Dimethylsilandiylbis(2-methyl-5-t-butyl-1-indenyl)ZrCl$_2$,
Dimethylsilandiylbis(2,5,6-trimethyl-1-indenyl)ZrCl$_2$, and the like.

These preferred metallocene catalyst components are described in detail in U.S. Pat. Nos. 5,145,819; 5,243,001; 5,239,022; 5,329,033; 5,296,434; 5,276,208; and 5,374,752; and EP 549 900 and 576 970 all of which are herein fully incorporated by reference.

The metallocenes preferably selected for use in this invention are at least one metallocene catalyst system capable of producing isotactic, crystalline propylene polymer. If two metallocenes are used, then particularly preferred metallocenes are those selected from formulas A and/or B which when used alone to produce propylene homopolymer, are capable of producing an isotactic polymer having a weight average molecular weight of from about 25,000 to about 1,500,000 at commercially attractive temperatures of from about 50° C. to about 120° C. For some applications it is preferable to select two or more metallocenes which produce polymers having different molecular weights. This results in a broader molecular weight distribution.

Thus preferably at least one metallocene is selected from the group consisting of rac-: dimethylsilandiylbis(2-methylindenyl)zirconium dichloride; dimethylsilandiylbis (2,4-dimethylindenyl)zirconium dichloride; dimethylsilandiylbis(2,5,6-trimethylindenyl)zirconium dichloride; dimethylsilandiylbis indenyl zirconium dichloride; dimethylsilandiylbis(4,5,6,7-tetrahydroindenyl) zirconium dichloride and dimethylsilandiylbis(2-methyl-4,5-benzoindenyl)zirconium dichloride; dimethylsilandiylbis (2-methyl-4-phenylindenyl)zirconium dichloride; dimethylsilandiylbis(2-methyl-4,6-diisopropylindenyl) zirconium dichloride; dimethylsilandiylbis(2-methyl-4-napthylindenyl)zirconium dichloride; and dimethylsilandiylbis(2-ethyl-4-phenylindenyl)zirconium dichloride.

If two metallocenes are used, their ratio will depend partly on the activities of the metallocenes and on the desired contribution of each. Thus, for example, if two metallocenes are used in a 1:1 ratio and the activities of each are similar, then the polymer product will be expected to comprise about 50% of polymer produced by one metallocene and about 50% of polymer produced by the other. The breadth of the product's molecular weight distribution will depend at least partly on the difference in molecular weight capability between the metallocenes. The addition of comonomer and/or hydrogen in the polymerization process may affect the contribution of each metallocene as described in detail below.

Activators

Metallocenes are generally used in combination with some form of activator in order to create an active catalyst system. The term "activator" is defined herein to be any compound or component, or combination of compounds or components, capable of enhancing the ability of one or more metallocenes to polymerize olefins to polyolefins. Alklyalumoxanes are preferably used as activators, most preferably methylalumoxane (MAO). Generally, the alkylalumoxanes preferred for use in olefin polymerization contain about 5 to 40 of the repeating units:

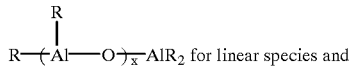 for linear species and

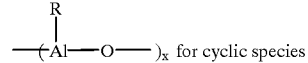 for cyclic species where R is a $C_1$–$C_8$ alkyl including mixed alkyls. Particularly preferred are the compounds in which R is methyl. Alumoxane solutions, particularly methylalumoxane solutions, may be obtained from commercial vendors as solutions having various concentrations. There are a variety of methods for preparing alumoxane, non-limiting examples of which are described in U.S. Pat. Nos. 4,665,208, 4,952, 540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,329,032, 5,416,229, 5,391,793 and EP-B1-0 279 586, EP-B1-0 287 666 and EP-B1-0 406 912, each fully incorporated herein by reference. (as used herein unless otherwise stated "solution" refers to any mixture including suspensions.)

Some MAO solutions tend to become cloudy and gelatinous over time. It may be advantageous to clarify such solutions prior to use. A number of methods are used to create gel-free MAO solutions or to remove gels from the solutions. Gelled solutions are often simply filtered or decanted to separate the gels from the clear MAO. U.S. Pat. No. 5,157,137, for example, discloses a process for forming clear, gel-free solutions of alkylalumoxane by treating a solution of alkylalumoxane with an anhydrous salt and/or hydride of an alkali or alkaline earth metal.

Ionizing activators may also be used to activate metallocenes. These activators are neutral or ionic, or are compounds such as tri(n-butyl)ammonium tetrakis (pentaflurophenyl)boron, which ionize the neutral metallocene compound. Such ionizing compounds may contain an active proton, or some other cation associated with but not coordinated or only loosely coordinated to the remaining ion of the ionizing compound. Combinations of activators may also be used, for example, alumoxane and ionizing activators in combinations, see for example, EP-B1-0 662 979.

Descriptions of ionic catalysts for coordination polymerization comprised of metallocene cations activated by non-coordinating anions appear in the early work in EP-A-0 277 004, EP-B1-0 672 688, EP-B1-0 551 277 and U.S. Pat. Nos. 5,198,401, 5,278,119, 5,407,884, 5,483,014 (incorporated herein by reference). These teach a preferred method of preparation wherein metallocenes (bisCp and monoCp) are protonated by an anion precursor such that an alkyl/hydride group is abstracted from a transition metal to make it both cationic and charge-balanced by the non-coordinating anion.

The term "noncoordinating anion" means an anion which either does not coordinate to said cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization.

The use of ionizing ionic compounds not containing an active proton but capable of producing the both the active metallocene cation and a noncoordinating anion is also known. See, EP-B1-0 426 637 and EP-A3-0 573 403 (incorporated herein by reference). An additional method of making the ionic catalysts uses ionizing anion pre-cursors which are initially neutral Lewis acids but form the cation and anion upon ionizing reaction with the metallocene compounds, for example the use of tris(pentafluorophenyl) boron. See EP-B1-0 520 732 (incorporated herein by reference). Ionic catalysts for addition polymerization can also be prepared by oxidation of the metal centers of transition metal compounds by anion pre-cursors containing metallic oxidizing groups along with the anion groups, see EP-B1-0 495 375 (incorporated herein by reference).

Where the metal ligands include halogen moieties (for example, bis-cyclopentadienyl zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See EP-A4-0 500 944 and EP-B1-0 570 982 and U.S. Pat. No. 5,434,115 (incorporated herein by reference) for in situ processes describing the reaction of alkyl aluminum compounds with dihalo-substituted metallocene compounds prior to or with the addition of activating anionic compounds.

Support Materials

The catalyst systems used in the process of this invention are preferably supported using a porous particulate material, such as for example, talc, inorganic oxides, inorganic chlorides and resinous materials such as polyolefin or polymeric compounds.

The most preferred support materials are porous inorganic oxide materials, which include those from the Periodic Table of Elements of Groups 2, 3, 4, 5, 13 or 14 metal oxides. Silica, alumina, silica-alumina, and mixtures thereof are particularly preferred. Other inorganic oxides that may be employed either alone or in combination with the silica, alumina or silica-alumina are magnesia, titania, zirconia, and the like.

Preferably the support material is porous silica which has a surface area in the range of from about 10 to about 700 $m^2/g$, a total pore volume in the range of from about 0.1 to about 4.0 cc/g and an average particle size in the range of from about 10 to about 500 $\mu$m. More preferably, the surface area is in the range of from about 50 to about 500 $m^2/g$, the pore volume is in the range of from about 0.5 to about 3.5 cc/g and the average particle size is in the range of from about 20 to about 200 $\mu$m. Most preferably the surface area is in the range of from about 100 to about 400 $m^2/g$, the pore volume is in the range of from about 0.8 to about 3.0 cc/g and the average particle size is in the range of from about 30 to about 100 $\mu$m. The average pore size of typical porous support materials is in the range of from about 10 to about 1000 Å. Preferably, a support material is used that has an average pore diameter of from about 50 to about 500 Å, and most preferably from about 75 to about 350 Å. It may be particularly desirable to dehydrate the silica at a temperature of from about 100° C. to about 800° C. anywhere from about 3 to about 24 hours.

The metallocene(s), activator and support material may be combined in any number of ways. Suitable support techniques are described in U.S. Pat. Nos. 4,808,561 and 4,701,432 (each fully incorporated herein by reference.). Preferably the metallocene(s) and activator are combined and their reaction product supported on the porous support material as described in U.S. Pat. No. 5,240,894 and WO 94/28034, WO 96/00243, and WO 96/00245 (each fully incorporated herein by reference.) Alternatively, the metallocene(s) may be preactivated separately and then combined with the support material either separately or together. If metallocenes are separately supported, then preferably, they are dried then combined as a powder before use in polymerization.

Regardless of whether the metallocene(s) and activator are separately precontacted or whether the metallocene(s) and activator are combined at once, the total volume of reaction solution applied to porous support is preferably less than about 4 times the total pore volume of the porous support, more preferably less than about 3 times the total pore volume of the porous support and even more preferably in the range of from more than about 1 to less than about 2.5 times the total pore volume of the porous support. Procedures for measuring the total pore volume of porous support are well known in the art. The preferred method is described in Volume 1, *Experimental Methods in Catalyst Research*, Academic Press, 1968, pages 67–96.

Methods of supporting ionic catalysts comprising metallocene cations and noncoordinating anions are described in EP-B1-0 507 876 and U.S. Pat. No. 5,643,847 and WO 94/03506. The methods generally comprise either physical adsorption on traditional polymeric or inorganic supports that have been largely dehydrated and dehydroxylated, or using neutral anion precursors that are sufficiently strong Lewis acids to activate retained hydroxy groups in silica containing inorganic oxide supports such that the Lewis acid becomes covalently bound and the hydrogen of the hydroxy group is available to protonate the metallocene compounds.

The supported catalyst system may be used directly in polymerization or the catalyst system may be prepolymerized using methods well known in the art. For details regarding prepolymerization, see U.S. Pat. Nos. 4,923,833 and 4,921,825, EP 0 279 863 and EP 0 354 893 each of which is fully incorporated herein by reference.

Polymerization Processes

The polymer compositions of this invention are generally prepared in a multiple stage process wherein homopolymerization and copolymerization are conducted separately in parallel or, preferably in series. In a preferred mode, propylene is homopolymerized and thereafter propylene and comonomer are copolymerized in the presence of the initially produced homopolymer using the above described metallocene catalyst systems. If, however, the copolymer is prepared first, the subsequently prepared "homopolymer" is likely to contain some traces of comonomer.

Individually, each stage may involve any process including gas, slurry or solution phase or high pressure autoclave processes. Preferably a slurry (bulk liquid propylene) polymerization process is used in each stage.

A slurry polymerization process generally uses pressures in the range of from about 1 to about 100 atmospheres (about 0.1 to about 10 MPa) or even greater and temperatures in the range of from −60° C. to about 150° C. In a slurry polymerization, a suspension of solid, particulate polymer is formed in a liquid or supercritical polymerization medium to which propylene and comonomers and often hydrogen along with catalyst are added. The liquid employed in the polymerization medium can be, for example, an alkane or a cycloalkane. The medium employed should be liquid under the conditions of polymerization and relatively inert such as hexane and isobutane. In the preferred embodiment, propylene serves as the polymerization diluent and the polymerization is carried out using a pressure of from about 200 kPa to about 7,000 kPa at a temperature in the range of from about 50° C. to about 120° C.

The periods of time for each stage will depend upon the catalyst system, comonomer and reaction conditions. In general, propylene should be homopolymerized for a time period sufficient to yield a composition having from about 10 to about 90 weight percent homopolymer based on the total weight of the polymer, preferably from about 20 to about 80 weight percent, even more preferably from about 30 to about 70 homopolymer weight percent based on the total weight of the polymer.

The polymerization may be conducted in batch or continuous mode and the entire polymerization may take place in one reactor or, preferably, the polymerization may be carried out in a series of reactors. If reactors in series are used, then the comonomer may be added to any reactor in the series, however, preferably, the comonomer is added to the second or subsequent reactor.

Hydrogen may be added to the polymerization system as a molecular weight regulator in the first and/or subsequent reactors depending upon the particular properties of the product desired and the specific metallocene used. When two metallocenes having different hydrogen responses are used, the addition of hydrogen will affect the molecular weight distribution of the polymer product accordingly. A preferred product form is to have the comonomer be present in the high molecular weight species of the total polymer composition to provide a favorable balance of fiber and fabric elasticity and strength combined with a broad bonding window for easy processing. Accordingly in this preferred case, the same or lower levels of hydrogen are utilized during copolymerization in the second or subsequent reactor as are used during homopolymerization in the first reacor.

Polymer Compositions

The polymer compositions of this invention are a reactor blend of isotactic crystalline propylene homopolymer and copolymer. The polymer comprises from about 10 to about 90 weight percent homopolymer based on the total weight of the polymer, preferably from about 20 to about 80 weight percent, even more preferably from about 30 to about 70 weight percent homopolymer based on the total weight of the polymer.

Any comonomer may be used to make the polymers of this invention. Preferably the comonomer is selected from the alpha-olefin group consisting of ethylene, 1-butene, 1-pentene, 1-hexene, and 1-octene. Combinations of comonomers can also be used. The most preferred of these comonomers are ethylene, 1-pentene, and 1-hexene. Diolefins and cyclic olefins may also be used.

The amount of comonomer used will depend on the type of comonomer and desired properties. The final composition may contain any amount of comonomer as long as the components of the composition remain crystalline. In general the amount of comonomer units based on the total weight of the polymer is in the range of from about 0.05 to about 15 weight percent, preferably from about 0.1 to about 10 weight percent, even more preferably from about 0.5 to about 8 weight percent, even more preferably from about 0.5 to about 5 weight percent, and most preferably 0.5 to about 2 weight percent based on the total weight of the polymer. Conversely, the polymer comprises from about 99.95 to about 85 weight percent propylene units based on the total weight of the polymer, preferably from about 99.90 to about 90 weight percent, more preferably from about 99.5 to about 92 weight percent, even more preferably from about 99.5 to about 95 weight percent, and most preferably from about 99.5 to about 98 weight percent propylene units based on the total weight of the polymer.

The polymers of this invention also retain the low extractables levels characteristic of single-site metallocene-based polymers, which are typically under 2 weight percent, preferably under 1 weight percent, as measured by 21 CFR Code of Federal Regulations 177.1520(d)(3)(ii). (1992)

The propylene polymer compositions of this invention preferably have a weight average molecular weight ($M_w$) that is in the range of from about 50,000 to about 500,000 preferably from about 100,000 to about 250,000, and most preferably from about 125,000 to about 200,000. These polymer compositions preferably have a melt flow rate (MFR) that is in the range of from about 1 dg/min. to about 3000 dg/min., preferably from about 5 dg/min. to about 70 dg/min., even more preferably from about 10 dg/min. to about 50 dg/min.

The polymers of this invention can be blended with other polymers, particularly with other polyolefins. Examples of such would include blends with conventional propylene polymers.

Fibers and Nonwoven Fabrics

EXAMPLES

The properties of the propylene polymers evaluated in the examples are given in Table 1. It is notable in comparing the polymer properties listed in Table 1, that the MWD of the Invention Polymers are more narrow than those of the Ziegler-Natta Controls despite the fact the Controls are isotactic homopolymers prepared by Controlled Rheology (cr) Process. More importantly, these Inventive polymers are shown to be unique when the melting points are considered. The high melting point of the homopolymer is maintained, despite the inclusion of a selectively added amount of comonomer, while the softening temperature is reduced. This is evident in the improved bonding of fibers of these polymers on spunbonding.

TABLE I

Polymers Employed in Spunbonded Fabric and Fiber Preparation

| Polymer | Identification | MFR[1], dg/min | Poly-dispers-ity as Mw/Mn[2] | Melt Temp by DSC, °C. | Ethy-lene, wt % |
|---|---|---|---|---|---|
| Control A | PP-3445 Ziegler-Natta-based, CR'ed PP | 36 | 2.7 | 160 | 0 |
| Control B | PP-3155 Ziegler-Natta-based, CR'ed PP | 36 | 3.2 | 162 | 0 |
| Control C | EX3825 Metallocene-based, PP | 32 | 2.0 | 149 | 0 |
| Control D | EX3854 Metallocene-based, PP | 24 | 2.0 | 149 | 0 |
| Invention | Metallocene-based PP | 38 | 1.9 | 145 | 1.1 |
| Invention | Metallocene-based PP | 27 | 2.6 | 150 | 0.5 |
| Invention | Mixed-Metallocene-based PP | 14.6 | 2.4 | 149 | 0.9 |
| Invention | Metallocene-based PP | 31 | 2.2 | 144 | 1.2 |

1 MFR is measured by the method of ASTM-1238 condition L.
2 Gel Permeation Chromatography (GPC) is a liquid chromatography technique widely used to measure the molecular weight (Mw) and molecular weight distributions (MWD) or polydispersity of polymers. This is a common and well-known technique. Such characteristics, as described here, have been measured using the following broadly practiced techniques. Equipment and Regents Used: Waters model 150C chromatograph; Three (3) Shodex AT-806MS (mixed bed) columns; 1,2,4-trichlorobenzene (HPLC grade) as solvent; Sample polymer to be tested. Operating Conditions: Temperature—145° C., Flow rate—1 ml/min; Run time—50 min; Injection vol.—300 microliters ($\mu l$).

Catalyst System and Polymer Preparation

The catalyst system used to prepare Invention A polymer was made as follows: A precursor solution was prepared by combining 140 lb of 30 wt % methylaluminoxane in toluene (MAO from Albemarle Corp., Baton Rouge, La.) with 1.58 lb of dimethylsilylbis(2-methyl-indenyl)zirconium dichloride under mixing. The precursor solution was added to 150 lb of Davison MS952 silica, (available from W. R. Grace, Davison Chemical Division, Baltimore, Mass.) previously heated to 600° C. under $N_2$. 215 lb toluene was used for complete transfer. Mixing was continued for an additional 30 minutes then 7.5 lb of Kenamine AS990 (Oleochemicals/Surfactants Group, WITCO, Memphis, Tenn.) as a 20% solution in toluene by weight was added. The mixer was heated to 50° C. under 27 inches of Hg vacuum until residual volatiles measured less than 7% by weight. Then mineral oil (Drakeol 35, Penreco, Dickinson, Tex. $N_2$ sparged for 12 hours at 88° C.) was added to give a 22.5% by weight solids slurry. Solids elemental analysis showed 0.145 wt % Zr and 9.70 wt % Al.

The procedure for preparation of Invention A polymer was as follows: The polymerization was conducted in a pilot scale continuous, stirred tank, bulk liquid phase polymerization process employing two reactors in series. The two reactors were equipped with jackets for removing the heat of polymerization. The reactor temperature was set at 64° C. (148° F.) in the first reactor and 59° C. (138° F.) in the second reactor. The catalyst prepared as described above was fed as a 20 wt-% solution in mineral oil at a rate of 16 ml/hr along with a 2 wt-% solution of TEAL in hexane solvent. Propylene was fed at a rate of about 40.9 kg/hr (90 lbs/hr) to the first reactor and 27.3 kg/hr (60 lb/hr) to the second reactor. Hydrogen was added for molecular weight control at 750 mppm in the first reactor. No hydrogen was added to the second reactor (blocked). Ethylene was added to the second reactor to give a concentration of 1.2 % in the gas. Residence times were about 2.65 hours in the first reactor and 1.9 hours in the second reactor. The production rate of polymer was about 42.3 kg/hr (93 lbs/hr). The polymer was discharged from the reactors as a granular product having a MFR of 35–45 dg/min. Evaluation of the final product showed a polypropylene copolymer with a MFR of about 38 dg/min and a total ethylene content of 1.1 wt-%.

The catalyst system used to prepare Invention B polymer was made as follows: A precursor solution was prepared by combining 885 g of 30 wt % methylaluminoxane in toluene (DMAO-25010 from Albemarle Corp., Baton Rouge, La.) representing 4.39 moles Al with 20.0 g of dimethylsilylbis(2-methyl- 4-phenyl-indenyl)zirconium dichloride (0.03 moles Zr) and 1760 g of toluene with stirring. The precursor solution was added to 807.4 g of Davison MS948 silica, (available from W. R. Grace, Davison Chemical Division, Baltimore, Mass.) previously heated to 600° C. under $N_2$. 308 g toluene was added to thin the slurry and stirring continued for an additional 20 minutes. The mixer was heated to 65° C. while a purge of $N_2$ was used to remove volatiles. After 8 hours drying a free flowing solid weighing 1055 g was obtained. Elemental analysis showed 0.256 wt % Zr and 11.08 wt % Al.

The procedure for polymerizing Invention B polymer was as follows: The polymerization was conducted in a pilot scale continuous, stirred tank, bulk liquid phase polymerization process employing two reactors in series. The two reactors were equipped with jackets for removing the heat of polymerization. The reactor temperature was set at 70° C. (158° F.) in the first reactor and 64° C. (148° F.) in the second reactor. The catalyst prepared as described above was fed as a 20 wt-% solution in mineral oil at a rate of 24 ml/hr with a 2 wt-% solution of TEAL in hexane solvent. Propylene was fed at a rate of about 40.9 kg/hr (90 lbs/hr) to the first reactor and 27.3 kg/hr (60 lb/hr) to the second reactor. Hydrogen was added for molecular weight control at 2800 mppm in the first reactor and 3000 mppm in the second reactor. Ethylene was added to the second reactor to give a concentration of 4.2% in the gas. Residence times were about 3.0 hours in the first reactor and 2.0 hours in the second reactor. The production rate of polymer was about 31.8 kg/hr (70 lbs/hr). The polymer was discharged from the reactors as a granular product having a MFR of 20–30 dg/min. Evaluation of the final product showed a polypropylene copolymer with a total ethylene content of about 0.5 wt %.

The catalyst system used to prepare Invention C polymer was made as follows: In an inert $N_2$ atmosphere 6.87 g of dimethylsilanediyl-bis(2-methyl-4-phenylindenyl)$ZrC_2$ was combined with 5.31 g of dimethylsilanediyl-bis(2-methyl-indenyl) $ZrC_2$ and 747.8 g of 30 wt % methylalumoxane solution in toluene (MAO-I, Albemarle Corporation, Baton Rouge, La.). 2222 g of toluene was added to dilute the solution. Separately 805.7 g MS952 silica (Davison Chemical Division of W. R. Grace, Baltimore, Md.) previously dehydrated to 600° C. in a stream of flowing $N_2$ was charged to the catalyst preparation vessel. With the agitator on the metallocene—aluminoxane solution was added to the silica. After addition of the solution mixing continued for one hour and then a solution of Kemamine AS-990 (Humko Chemical Div, Wotco Corporation) consisting of 8.0 g in 80.0 g toluene was added to the slurry and stirring continued for 0.5 hour. Afterwards vacuum was applied and a slight nitrogen purge was added to the bottom of the vessel to aid in removing the volatiles. At the end of drying 939.9 g of free flowing solid was obtained. Analysis showed a loading of 10.20 wt % Al and 0.20 wt % Zr with an Al/Zr molar ratio of 174.

The procedure for preparation of Invention C was as follows: The polymerization was conducted in a pilot scale continuous, stirred tank, bulk liquid phase polymerization process employing two reactors in series. The two reactors were equipped with jackets for removing the heat of polymerization. The reactor temperature was set at 70° C. (158° F.) in the first reactor and 64° C. (147° F.) in the second reactor. The catalyst prepared as described above was fed as a 20 wt-% solution in mineral oil at a rate of 16 ml/hr along with a 2 wt-% solution of TEAL in hexane solvent. Propylene was fed at a rate of about 40.9 kg/hr (90 lbs/hr) to the first reactor and 27.3 kg/hr (60 lb/hr) to the second reactor. Hydrogen was added for molecular weight control at 1500 mppm in the first reactor. No hydrogen was added to the second reactor (blocked). Ethylene was added to the second reactor to give a concentration of about 2 % in the gas. Residence times were about 2.4 hours in the first reactor and 1.7 hours in the second reactor. The production rate of polymer was 90 to 150 kg/hr (40–70 lbs/hr). The polymer was discharged from the reactors as a granular product having a MFR of about 15 dg/min. Evaluation of the final product showed a polypropylene copolymer with a MFR of about 14.6 dg/min and a total ethylene content of 0.94 wt-%.

Control A and Control B may be obtained as "PP-3445" and "PP-3 155" respectively from Exxon Chemical Company, Houston, Tex.

Control C and Control D may be obtained as "EX3825" and "EX3854" respectively from Exxon Chemical Company, Houston, Tex.

The Spunbonding Process

The spunbonding process is one which is well known in the art of fabric production. Generally, continuous fibers are extruded, attenuated by pnuematic or mechanical means, laid on an endless belt, and then bonded to each other, often by a heated calender roll. An overview of spunbonding may be obtained from Wadsworth, L. C. and Goswami, B. C., Nonwoven Fabrics: "Spunbonded and Melt Blown Processes", proceedings of the *Eighth Annual Nonwovens Workshop*, Jul. 30–Aug. 3, 1990, sponsored by TANDEC, University of Tennessee, Knoxville.

Preparation of Spunbonded Fabrics

Spunbonded fabrics were produced on an upgraded one meter Reicofil line, commercially produced by Reifenhäuser Gmbh & Maschinenfabrik of Troisdorf, Germany and located at The Textiles and Nonwovens Development Center (TANDEC) at the University of Tennessee -Knoxville. The extruder is 70 mm (2.75 in) with a 30:1 length:diameter ratio. There were 4036 die plate holes, each having a diameter of 0.6 mm. The processing conditions employed for each spunbond fabric preparation are given in Table II.

TABLE II

Processing Conditions for Preparation of Spunbonded Fabrics

| Polymer | Die Temp, ° C. | Through-Put ghm | Cooling Air Fan, rpm | Suction Air Fan, rpm |
| --- | --- | --- | --- | --- |
| Control A | 230 | 0.4 | 3000 | 2500 |
| Control B | 240 | 0.4 | 3000 | 2500 |
| Control C | 230 | 0.4 | 3000 | 2500 |
| Control D | 240 | 0.4 | 3000 | 2500 |
| Invention A | 230 | 0.4 | 3000 | 2500 |
| Invention B | 240 | 0.4 | 3000 | 2500 |

Invention A, and Controls A and C were extruded at a die temperature of 230° C., while Invention B and Control B and D were extruded at 240° C. The molten fibers were quenched with chilled air (approximately 66±2° F.). Spunbonded fabrics were collected at a throughput of 0.4 gram/hole/minute at basis weights of 25, 60 and 80 grams/m². The fabrics were bonded over a broad range of temperatures, at 10° F. intervals, to optimize calender temperature for fabric strength.

Spunbonded fabrics of two metallocene-based Invention polymers were prepared. Four polypropylene homopolymers were also tested as Controls. Two of the Control polymers were metallocene-based homopolymers and two others were Ziegler-Natta type catalyzed polymers with reduced MWD by post-reactor Controlled Rheology (CR).

Fabric testing was performed according to ASTM standard D5035-90, with the following exceptions: A gauge length of 5 inches and a crosshead speed of 5 inches per minute were used. Six-1 inch wide strips were cut in both the achine direction (MD) and the Transverse direction (TD) of the spunbond fabric or testing. Fabric failure was defined as the point at which the tensile force dropped to 90% of the peak load. The maximum load, elongation at maximum load, and the elongation to break were measured for both the MD and TD.

Example 1

Invention Polymer A

As evident in the data in Tables III and IV, the 25 gsm spunbonded fabrics the Invention A metallocene-based polymer has about the same maximum tensile strength in the MD as the Controls, but it is much stronger in the TD at calender heating oil temperatures of 290° F. and less. The maximum TD strength of Invention A is advantageously found at a calender heating oil temperature about 20° F. lower than that of the fabrics from Controls A, B, and C, and 10° F. lower than Control D. It is also stronger in the MD at calender heating oil temperatures less than 280° F.

When basis weight is increased to 60 gsm, shown in Tables V and VI, the maximum TD strength of Invention A fabric is about the same or higher than any of the Controls. It is stronger in the MD than either Control A or C. At calender heating oil temperatures of 310° F. or lower, the fabric of the Invention A is much stronger in either the MD or TD than any of the Controls. The maximum strength is formed at a calender heating oil temperature 10–20° F. lower than any of the Control fabrics.

At 80 gsm, Tables VII and VIII, the maximum strength of the Invention A fabric is about the same or higher in both the MD and TD than any of the Control fabrics. At calender heating oil temperatures of 320° F. or lower, the fabric of the Invention A is much stronger in either the MD or TD than any of the Control fabrics.

Example 2

Invention Polymer B

As is evident in the data of Table III and IV, the 25 gsm spunbonded fabrics made from Invention B, the metallocene-based propylene polymer has about the same maximum tensile strengths as the Control; however, it is stronger in the TD at calender heating oil temperatures of 290° F. and less. The fabrics of Invention B have a maximum TD strength at a calender heating oil temperature about 10° F. lower than that of fabrics from Controls A, B or C.

The basis weight of 60 gsm is shown in Tables V and VI. At the preferred bonding temperature, the maximum strength of the Invention B fabric is about the same or higher in both the MD and TD than any of the Control fabrics. At calender heating oil temperatures of 310° F. or less the Invention B fabric is stronger in either MD or TD than any of the Controls.

As shown in Tables VII and VII, the maximum strength of Invention B of 80 gsm fabrics is about the same or higher in both the MD and TD than any of the Controls. At calender heating oil temperatures of 320° F. and lower, the Invention B fabrics are much stronger in either the MD or TD than any of the Controls.

TABLE III

Spunbonded Fabric Properties (Tensile Strength) (MD at 25 gsm) When Prepared at 0.4 ghm

| Calendar Temp, ° F. | Control A | Control B | Control C | Control D | Invention A | Invention B |
|---|---|---|---|---|---|---|
| 260 | 1.86 | | | | 4.26 | |
| 270 | 2.55 | | 5.47 | | 6.41 | |
| 280 | 6.21 | 3.82 | 4.96 | 6.50 | 6.83 | 7.56 |
| 290 | 7.08 | 6.00 | 7.35 | 7.67 | 7.17 | 8.14 |
| 300 | 7.02 | 8.10 | 8.30 | 6.70 | 5.75 | 7.21 |
| 310 | 6.75 | 7.28 | 6.32 | 5.20 | 3.57 | 5.72 |
| 320 | | | | | 3.18 | |

TABLE IV

Spunbonded Fabric Properties (Tensile Strength) (TD at 25 gsm) When Prepared at 0.4 ghm

| Calendar Temp, ° F. | Control A | Control B | Control C | Control D | Invention A | Invention B |
|---|---|---|---|---|---|---|
| 260 | 0.94 | | | | 2.68 | |
| 270 | 1.49 | | 2.03 | | 4.08 | |
| 280 | 2.62 | 2.07 | 3.14 | 3.42 | 4.43 | 4.10 |
| 290 | 3.98 | 3.22 | 4.10 | 4.24 | 4.33 | 4.61 |
| 300 | 4.55 | 4.33 | 4.80 | 3.76 | 3.10 | 4.19 |
| 310 | 4.16 | 4.25 | 3.47 | 3.13 | 2.19 | 2.95 |
| 320 | | | | | 2.18 | |

TABLE V

Spunbonded Fabric Properties (MD at 60 gsm) When Prepared at 0.4 ghm

| Calendar Temp, ° F. | Control A | Control B | Control C | Control D | Invention A | Invention B |
|---|---|---|---|---|---|---|
| 280 | 6.39 | | | | 10.04 | 9.69 |
| 290 | 7.80 | | 9.40 | 9.39 | 14.39 | 13.92 |
| 300 | 10.51 | 11.88 | 12.34 | 13.31 | 18.04 | 20.11 |
| 310 | 14.72 | 16.64 | 17.79 | 16.52 | 18.61 | 21.02 |
| 320 | 17.31 | 17.33 | 20.16 | 20.34 | 15.08 | 15.29 |
| 330 | 14.91 | 14.55 | 16.71 | 14.64 | | |

TABLE VI

Spunbonded Fabric Properties (TD at 60 gsm) When Prepared at 0.4 ghm

| Calendar Temp, ° F. | Control A | Control B | Control C | Control D | Invention A | Invention B |
|---|---|---|---|---|---|---|
| 280 | 4.03 | | | | 7.49 | 6.67 |
| 290 | 5.56 | | 6.48 | 6.58 | 10.07 | 9.39 |
| 300 | 7.59 | 7.83 | 8.61 | 9.00 | 12.19 | 12.70 |
| 310 | 10.53 | 11.27 | 11.58 | 11.16 | 13.00 | 12.92 |
| 320 | 12.40 | 11.36 | 13.67 | 11.72 | 10.71 | 9.72 |
| 330 | 10.70 | 10.19 | 10.97 | 10.11 | | |

TABLE VII

Spunbonded Fabric Properties (MD at 80 gsm) When Prepared at 0.4 ghm

| Calendar Temp, ° F. | Control A | Control B | Control C | Control D | Invention A | Invention B |
|---|---|---|---|---|---|---|
| 280 | | | | | | |
| 290 | | | 9.70 | | 13.35 | 14.18 |
| 300 | 10.60 | | 12.13 | 12.17 | 16.63 | 17.68 |
| 300 | 14.80 | 15.82 | 16.37 | 16.92 | 22.18 | 24.19 |
| 320 | 19.60 | 21.37 | 22.44 | 22.12 | 22.92 | 24.58 |
| 330 | 22.00 | 21.91 | 23.72 | 22.66 | | 20.15 |

TABLE VIII

Spunbonded Fabric Properties (TD at 80 gsm) When Prepared at 0.4 ghm

| Calendar Temp, ° F. | Control A | Control B | Control C | Control D | Invention A | Invention B |
|---|---|---|---|---|---|---|
| 280 | | | | | | |
| 290 | | | 6.97 | | 10.25 | 10.96 |
| 300 | 8.20 | | 9.01 | 9.04 | 13.18 | 13.60 |
| 310 | 11.10 | 12.09 | 11.89 | 11.65 | 16.14 | 16.65 |
| 320 | 14.00 | 14.78 | 15.17 | 14.17 | 17.30 | 15.86 |
| 330 | 15.40 | 15.32 | 16.25 | 15.86 | | 12.18 |

Example 3

Invention Polymer D

Spunbonded Fabrics were also produced on a commercial scale Reicofil III Spunbond Line produced and located at Reifenhäuser Gmbh & Maschinenfabrik in Troisdorf, Germany. This Reicofil III line is capable of higher polymer throughput rates and faster collector belt speeds than the one meter Reicofil line described above. The spin die plate contained 4411 holes with diameter of 0.6 mm over the one meter line width. The processing conditions used in preparation of the spunbonded fabrics are given in Table IX.

TABLE IX

Processing Conditions For Preparation of Spunbonded Fabrics on the Reicofil III Spunbond Line

| Polymer | Die Temperature ° C. | Throughput, ghm | Cooling Air Fan, rpm | Suction Air Rate, cm/hr |
|---|---|---|---|---|
| Control B | 255 | 0.55 | 1600 | 8600 |
| Control C | 253 | 0.55 | 1600 | 8600 |
| Invention D | 242 | 0.55 | 1525 | 8300 |

Invention D was extruded at a die temperature of 242° C., while the Controls B and C were extruded at about 255° C. The molten fibers were quenched with chilled air (approximately 20° C.). Spunbonded fabrics were produced at a throughput of 0.55 grams/hole/minute at fabric basis weights of 25, 40, and 60 grams/sm. These basis weight were produced at collector belt rates of 92.5 m/min (25 gsm), 57.5 m/min (40 gsm), and 38.5 mlmin (60 gms). The fabrics were thermally bonded, in-line, over a range of calendar temperatures at 5° C. intervals to establish the optimized temperature at maximum fabric strength and hand.

Spunbonded Fabrics of the metallocene-based Invention D and Controls B and C were collected and tested.

TABLE X

Spunbonded Fabric Properties (Tensile Strength) (TD at 25 gsm) When Prepared at 0.55 ghm

| Calendar Temp, ° C. | Control B | Control C | Invention D |
|---|---|---|---|
| 120 | | | 2.09 |
| 125 | | | 3.31 |
| 130 | | 2.16 | 4.70 |
| 135 | | 3.36 | 5.14 |
| 140 | | 3.75 | 4.68 |
| 145 | 4.13 | 4.11 | 3.7 |
| 150 | 4.23 | 4.07 | |
| 155 | 3.71 | | |

TABLE XI

Spunbonded Fabric Properties (Tensile Strength) (MD at 25 gsm) When Prepared at 0.55 ghm

| Calendar Temp, ° C. | Control B | Control C | Invention D |
|---|---|---|---|
| 120 | | | 4.43 |
| 125 | | | 7.19 |
| 130 | | 4.19 | 8.51 |
| 135 | | 6.51 | 8.33 |
| 140 | | 6.98 | 7.49 |
| 145 | 8.21 | 7.95 | 6.12 |
| 150 | 8.48 | 6.79 | |
| 155 | 6.35 | | |

TABLE XII

Spunbonded Fabric Properties (Tensile Strength) (TD at 40 gsm) When Prepared at 0.55 ghm

| Calendar Temp, ° C. | Control B | Control C | Invention D |
|---|---|---|---|
| 125 | | | 3.9 |
| 130 | | | 6.1 |
| 135 | | 4.1 | 7.8 |
| 140 | | 4.8 | 9.1 |
| 145 | 6.3 | 7.2 | 8.1 |
| 150 | 8.3 | 8.3 | |
| 155 | 7.9 | | |
| 160 | 6.7 | | |

TABLE XIII

Spunbonded Fabric Properties (Tensile Strength) (MD at 40 gsm) When Prepared at 0.55 ghm

| Calendar Temp, ° C. | Control B | Control C | Invention D |
|---|---|---|---|
| 125 | | | 6.7 |
| 130 | | | 10.4 |
| 135 | | 6.8 | 12.7 |
| 140 | | 8.1 | 14.4 |
| 145 | 11.1 | 11.8 | 13.5 |
| 150 | 13.7 | 12.6 | |
| 155 | 12.9 | | |
| 160 | 10.4 | | |

TABLE XIV

Spunbonded Fabric Properties (Tensile Strength) (TD at 60 gsm) When Prepared at 0.55 ghm

| Calendar Temp, ° C. | Control B | Control C | Invention D |
|---|---|---|---|
| 130 | | | 6.1 |
| 135 | | | 7.6 |
| 140 | | 4.7 | 10.6 |
| 145 | | 7.5 | 13.8 |
| 148 | | | 13.6 |
| 150 | 8.6 | 9.2 | |
| 155 | 11.2 | 11.9 | |
| 160 | 12.2 | | |

TABLE XV

Spunbonded Fabric Properties (Tensile Strength) (MD at 60 gsm) When Prepared at 0.55 ghm

| Calendar Temp, ° C. | Control B | Control C | Invention D |
|---|---|---|---|
| 130 | | | 9.5 |
| 135 | | | 11.8 |
| 140 | | 7.4 | 15.6 |
| 145 | | 12.1 | 20.2 |
| 148 | | | 20.5 |
| 150 | 14.3 | 14.6 | |
| 155 | 17.3 | 17.8 | |
| 160 | 18.3 | | |

TABLE XVI

Spunbonded Fabric Properties (Peak Elongation) (TD at 25 gsm)
When Prepared at 0.55 ghm

| Calendar Temp, °C. | Control B | Control C | Invention D |
|---|---|---|---|
| 120 | | | 26 |
| 125 | | | 44 |
| 130 | | 20 | 59 |
| 135 | | 34 | 62 |
| 140 | | 39 | 54 |
| 145 | 56 | 40 | 40 |
| 150 | 49 | 36 | |
| 155 | 36 | | |

TABLE XVII

Spunbonded Fabric Properties (Peak Elongation) (MD at 25 gsm)
When Prepared at 0.55 ghm

| Calendar Temp, °C. | Control B | Control C | Invention D |
|---|---|---|---|
| 120 | | | 26 |
| 125 | | | 50 |
| 130 | | 17 | 63 |
| 135 | | 35 | 62 |
| 140 | | 40 | 48 |
| 145 | 61 | 44 | 36 |
| 150 | 59 | 33 | |
| 155 | 31 | | |

TABLE XVIII

Spunbonded Fabric Properties (Peak Elongation) (TD at 40 gsm)
When Prepared at 0.55 ghm

| Calendar Temp, °C. | Control B | Control C | Invention D |
|---|---|---|---|
| 125 | | | 25 |
| 130 | | | 45 |
| 135 | | 21 | 57 |
| 140 | | 28 | 65 |
| 145 | 51 | 44 | 52 |
| 150 | 63 | 48 | |
| 155 | 50 | | |
| 160 | 38 | | |

TABLE XIX

Spunbonded Fabric Properties (Peak Elongation) (MD at 40 gsm)
When Prepared at 0.55 ghm

| Calendar Temp, °C. | Control B | Control C | Invention D |
|---|---|---|---|
| 125 | | | 26 |
| 130 | | | 46 |
| 135 | | 19 | 54 |
| 140 | | 25 | 64 |
| 145 | 47 | 41 | 56 |
| 150 | 61 | 42 | |
| 155 | 51 | | |
| 160 | 34 | | |

TABLE XX

Spunbonded Fabric Properties (Peak Elongation) (TD at 60 gsm)
When Prepared at 0.55 ghm

| Calendar Temp, °C. | Control B | Control C | Invention D |
|---|---|---|---|
| 130 | | | 33 |
| 135 | | | 41 |
| 140 | | 16 | 55 |
| 145 | | 31 | 67 |
| 148 | | | 63 |
| 150 | 52 | 37 | |
| 155 | 54 | 47 | |
| 160 | 52 | | |

TABLE XXI

Spunbonded Fabric Properties (Peak Elongation) (MD at 60 gsm)
When Prepared at 0.55 ghm

| Calendar Temp, °C. | Control B | Control C | Invention D |
|---|---|---|---|
| 130 | | | 27 |
| 135 | | | 36 |
| 140 | | 15 | 46 |
| 145 | | 26 | 62 |
| 148 | | | 60 |
| 150 | 36 | 33 | |
| 155 | 47 | 40 | |
| 160 | 48 | | |

As evident from the above data, the 25, 40, and 60 gsm spunbonded fabrics of Invention D metallocene-based polymer have higher maximum tensile strength in both MD and TD directions than the fabric of Controls B and C. Furthermore, the maximum tensile strength of fabrics of Invention D are advantageously found at lower calendar surface temperatures. The calendar surface temperatures are from 10 to 25° C. lower than those of the Control fabrics.

Consideration of the fabric elongation properties (elongation at Peak Load) in given in Tables IX through XXI, shows that the fabrics of Invention D have higher elongation than the fabrics of Controls B and C. Clearly superior tensile (above) and elongation properties can be obtained with the Invention polymers.

Fiber Preparation

Fibers were prepared as spun, flat partially oriented yarns by mechanical take-up of the fiber bundle from the melt extrudate. Fibers were produced on a fiberline assembled by J. J. Jenkins, Inc of Stallings, N.C. The fiber line extrusion was accomplished with a two inch (5 cm) Davis Standard (30:1 length/diameter) extruder and 6 cc/rev Zenith Metering Pump. Molten polymer was forced through a spinnerette plate of 72, 0.6 mm (1.2 l/d) holes.

Fibers were prepared by spin drawing from the 232° C. (450° F.) melt by an axially spinning unheated godet. The take-up rates of the godet were 1000 and 2000 meters per minute (m/min). The metering pump rate (rpm) was set to prepare 4.5 denier per filament, 325/72 denier fibers at both take-up rates. The solidified fibers were collected at each rate as five minute runs on a Leesona winder.

Fiber bundle strength, expressed as tenacity (grams per denier) and fiber elongation at break were determined by pulling on a Statimat Model M available from Lawson-Hemphill Sales, Inc. of Spartanburg, S.C. The Statimat M was employed with 100 mm fiber gauge length. The 10 Newton load cell was used with a 10 cN/denier preload and fiber extension to break was accomplished at 1270 mm/min. Break sensitivity was 95% drop in force.

Permanent Set by Loop Hysteresis was determined on a United Testing System, Inc. Model SFM-1 equipped with a 1000 lbs Load Frame and 20 lbs load cell. The fiber bundle of 2 inches length was preloaded with 0.10 lbs and elongated 20% at 5 in/min. At 20% elongation, the fiber bundle was held for 30 seconds and then returned to zero strain at 5 in/min. This process was repeated five times and the permanent set determined as unrecovered strain. Five repetitions made it possible to determine permanent set after four cycles. The permanent set is reported after Cycle 1 and Cycle 4.

Example 4

Invention Polymer C

Fibers of Invention C and Control C were prepared as described above. The fibers were then characterized for denier, elongation, and permanent set on strain. The results are given in Table XXII.

TABLE XXII

Relative Properties of Fibers

| Sample | Polymer | Take-Up Rate, M/min | Elongation, % | One Cycle Permanent Set, % | Four Cycle Permanent Set, % |
|---|---|---|---|---|---|
| 1 | Contol C | 1000 | 257 | 7.9 | 10.6 |
| 2 | Control C | 2000 | 159 | 8.8 | 11.0 |
| 3 | Invention C | 1000 | 218 | 4.6 | 6.7 |
| 4 | Invention C | 2000 | 163 | 4.8 | 6.1 |

On consideration of the fiber properties in Table XXII, it is readily apparent that the permanent set on strain is less with the fiber of Invention C. The values are almost one-half those of the Control polypropylene.

The desirable values of permanent set with the fibers of Invention C are found when comparing the materials in various ways. For example, the permanent set of the Invention is less with fibers prepared at the same threadline rate (Samples 1 & 3 and 2 & 4) and of fibers with comparable elongation at break (Samples 2 & 4).

While the present invention has been described and illustrated by reference to particular embodiments, it will be appreciated by those of ordinary skill in the art that the invention lends itself to many different variations not illustrated herein. For these reasons, then, reference should be made solely to the appended claims for purposes of determining the true scope of the present invention.

Although the appendant claims have single appendencies in accordance with U.S. patent practice, each of the features in any of the appendant claims can be combined with each of the features of other appendant claims or the main claim.

We claim:

1. A fiber comprising a crystalline propylene polymer composition comprising:
    a) from about 10 to about 90 weight percent crystalline, isotactic propylene homopolymer having a molecular weight distribution of less than or equal to 3;
    b) from about 90 to about 10 weight percent crystalline propylone copolymer having a molecular weight distribution of less than or equal to 3, wherein the weight percent of the comnonomer based on the total weight of the polymer is in the range of from about 0.05 to about 15; and
    c) wherein the polymer composition is prepared with a catalyst system consisting essentially of one metallocene catalyst.

2. The fiber of claim 1 wherein the comonomer weight percent is in the range of from about 0.1 to about 10.0.

3. The fiber of claim 1 wherein the comonomer is selected from the group consisting of ethylene, 1-butene, 1-pentene, 1-hexene, and 1-octene.

4. The fiber of claim 1 wherein the weight percent of the crystalline propylene homopolymer is in the range of from about 20 to about 80.

5. The fiber of claim 1 wherein the hexane extractables level is less than 2.0 wt % as measured by 21 CFR 177.1520(d)(3)(ii).

6. The fiber of claim 1 wherein the metallocene catalyst system is represented by the formula:

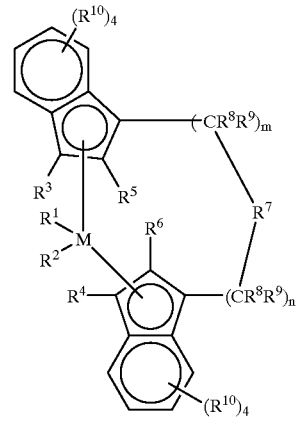

wherein M is a metal of Group 4, 5, or 6 of the Periodic Table preferably, zirconium, hafnium and titanium, most preferably zirconium;

$R^1$ and $R^2$ are identical or different, preferably identical, and are one of a hydrogen atom, a $C_1$–$C_{10}$ alkyl group, preferably a $C_1$–$C_3$ alkyl group, a $C_1$–$C_{10}$ alkoxy group, preferably a $C_1$–$C_3$ alkoxy group, a $C_6$–$C_{10}$ aryl group, preferably a $C_6$–$C_8$ aryl group, a $C_6$–$C_{10}$ aryloxy group, preferably a $C_6$–$C_8$ aryloxy group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, or a halogen atom, preferably chlorine;

$R^3$ and $R^4$ are hydrogen atoms;

$R^5$ and $R^6$ are identical or different, preferably identical, are one of a halogen atom, preferably a fluorine, chlorine or bromine atom, a $C_1$–$C_{10}$ alkyl group, preferably a $C_1$–$C_4$ alkyl group, which may be halogenated, a $C_6$–$C_{10}$ aryl group, which may be halogenated, preferably a $C_6$–$C_8$ aryl group, a $C_2$–$C_{10}$ alkenyl group, preferably a $C_2$–$C_4$ alkenyl group, a $C_7$–$C_{40}$-arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, preferably a chlorine atom, a $C_1$–$C_{10}$ alkyl group, preferably a $C_1$–$C_3$ alkyl group, or a $C_6$–$C_{10}$ aryl group, preferably a $C_6$–$C_9$ aryl group;

$R^7$ is

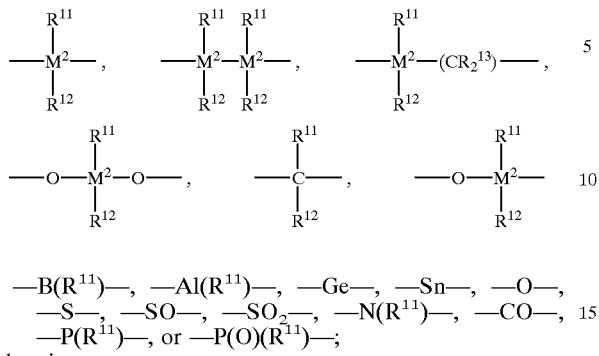

—B($R^{11}$)—, —Al($R^{11}$)—, —Ge—, —Sn—, —O—, —S—, —SO—, —SO$_2$—, —N($R^{11}$)—, —CO—, —P($R^{11}$)—, or —P(O)($R^{11}$)—;

wherein:

$R^{11}$, $R^{12}$ and $R^{13}$ are identical or different and are a hydrogen atom, a halogen atom, a $C_1$–$C_{20}$ alkyl group, preferably a $C_1$–$C_{10}$ alkyl group, a $C_1$–$C_{20}$ fluoroalkyl group, preferably a $C_1$–$C_{10}$ fluoroalkyl group, a $C_6$–$C_{30}$ aryl group, preferably a $C_6$–$C_{20}$ aryl group, a $C_6$–$C_{30}$ fluoroaryl group, preferably a $C_6$–$C_{20}$ fluoroaryl group, a $C_1$–$C_{20}$ alkoxy group, preferably a $C_1$–$C_{10}$ alkoxy group, a $C_2$–$C_{20}$ alkenyl group, preferably a $C_2$–$C_{10}$ alkenyl group, a $C_7$–$C_{40}$ arylalkyl group, preferably a $C_7$–$C_{20}$ arylalkyl group, a $C_8$–$C_{40}$ alalkenyl group, preferably a $C_8$–$C_{22}$ arylalkenyl group, a $C_7$–$C_{40}$ alkylaryl group, preferably a $C_7$–$C_{20}$ alkylaryl group or $R^{11}$ and $R^{12}$, or $R^{11}$ and $R^{13}$, together with the atoms binding them, can form ring systems;

$M^2$ is silicon, germanium or tin, preferably silicon or germanium, most prefetably silicon;

$R^8$ and $R^9$ are identical or different and have the meanings stated for $R^{11}$;

m and n are identical or different and are zeros 1 or 2, preferably zero or 1, m plus n being zero, 1 or 2, preferably zero or 1; and the radicals $R^{10}$ are identical or different and have the meariigs stated for $R^{11}$, $R^{12}$ and $R^{13}$. Two adjacent $R^{10}$ radicals can be joined together to form a ring system, preferably a ring system containing from about 4–6 carbon atoms.

7. A fabric comprising a crystalline propylene polymer composition comprising:

a) from about 10 to about 90 weight percent crystalline, isotatic propylene homopolymer haaving a molecular weight distribution of less than or equal to 3;

b) from about 90 to about 10 weight percent crystalline propylene copolymer having a molecular weight distibution of less than about 3, wherein the weight percent of the comonomer based on the total weight of the polymer is in the range of from about 0.05 to about 15; and wherein the polymer composition is prepared with a catalyst system consisting essentially of one metallocene catalyst.

8. The fabric of claim 7 wherein the comonomer weight percent is in the range of from about 0.1 to about 10.0.

9. The fabric of claim 7 wherein the comonomer is selected from the group consisting of ethylene, 1-butene, 1-pentene, 1-hexene, and 1-octene.

10. The fabric of claim 7 wherein the weight percent of the crystalline propylene homopolymer is in the range of from about 20 to about 80.

11. The fabric of claim 7 wherein the hexane extractables level is less than 2.0 wt % as measured by 21 CFR 177.1520(d)(3)(ii).

12. The fabric of claim 7 wherein the metallocene catalyst system is represented by the formula:

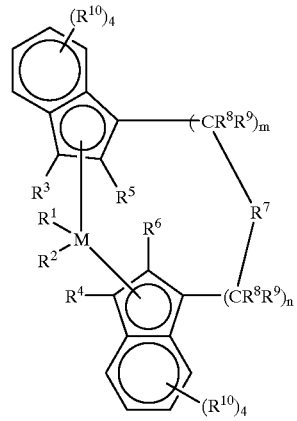

wherein M is a metal of Group 4, 5, or 6 of the Periodic Table preferably, zirconium, hafnium and titanium, most preferably zirconium;

$R^1$ and $R^2$ are identical or different, preferably identical, and are one of a hydrogen atom, a $C_1$–$C_{10}$ alkyl group, preferably a $C_1$–$C_3$ alkyl group, a $C_1$–$C_{10}$ alkoxy group, preferably a $C_1$–$C_3$ alkoxy group, a $C_6$–$C_{10}$ aryl group, preferably a $C_6$–$C_8$ aryl group, a $C_6$–$C_{10}$ aryloxy group, preferably a $C_6$–$C_8$ aryloxy group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, or a halogen atom, preferably chlorine;

$R^3$ and $R^4$ are hydrogen atoms;

$R^5$ and $R^6$ are identical or different, preferably identical, are one of a halogen atom, preferably a fluorine, chlorine or bromine atom, a $C_1$–$C_{10}$ alkyl group, preferably a $C_1$–$C_4$ alkyl group, which may be halogenated, a $C_6$–$C_{10}$ aryl group, which may be halogenated, preferably a $C_6$–$C_8$ aryl group, a $C_2$–$C_{10}$ alkenyl group, preferably a $C_2$–$C_4$ alkenyl group, a $C_7$–$C_{40}$-arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, a —NR$_2^{15}$, —SR$^{15}$, —OR$^{15}$, —OSiR$_3^{15}$ or —PR$_2^{15}$ radical, wherein $R^{15}$ is one of a halogen atom, preferably a chlorine atom, a $C_1$–$C_{10}$ alkyl group, preferably a $C_1$–$C_3$ alkyl group, or a $C_6$–$C_{10}$ aryl group, preferably a $C_6$–$C_9$ aryl group;

$R^7$ is

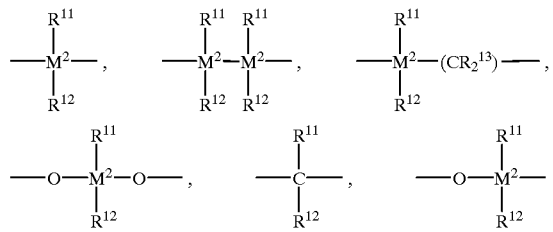

—B(R$^{11}$)—, —Al(R$^{11}$)—, —Ge—, —Sn—, —O—, —S—, —SO—, —SO$_2$—, —N(R$^{11}$)—, —CO—, —P(R$^{11}$)—, or —P(O)(R$^{11}$)—;

wherein:

$R^{11}$, $R^{12}$ and $R^{13}$ are identical or different and are a hydrogen atom, a halogen atom, a $C_1$–$C_{20}$ alkyl group, preferably a $C_1$–$C_{10}$ alkyl group, a $C_1$–$C_{20}$ fluoroalkyl group, preferably a $C_1$–$C_{10}$ fluoroalkyl group, a $C_6$–$C_{30}$ aryl group, preferably a $C_6$–$C_{20}$ aryl group, a $C_6$–$C_{30}$ fluoroaryl group, preferably a $C_6$–$C_{20}$ fluoroaryl group, a $C_1$–$C_{20}$ alkoxy group, preferably a $C_1$–$C_{10}$ alkoxy group, a $C_2$–$C_{20}$ alkenyl group, preferably a $C_2$–$C_{10}$ alkenyl group, a $C_7$–$C_{40}$ arylalkyl group, preferably a $C_7$–$C_{20}$ arylalkyl group, a $C_8$–$C_{40}$ arylalkenyl group, preferably a $C_8$–$C_{22}$ arylalkenyl group, a $C_7$–$C_{40}$ alkylaryl group, preferably a $C_7$–$C_{20}$ alkylaryl group or $R^{11}$ and $R^{12}$, or $R^{11}$ and $R^{13}$, together with the atoms binding them, can form ring systems;

$M^2$ is silicon, germanium or tin, preferably silicon or germanium, most preferably silicon;

$R^8$ and $R^9$ are identical or different and have the meanings stated for $R^{11}$;

m and n are identical or different and are zero, 1 or 2, preferably zero or 1, m plus n being zero, 1 or 2, preferably zero or 1; and the radicals $R^{10}$ are identical or different and have the meanings stated for $R^{11}$, $R^{12}$ and $R^{13}$. Two adjacent $R^{10}$ radicals can be joined together to form a ring system, preferably a ring system containing from about 4–6 carbon atoms.

13. A fiber comprising a crystalline propylene polymer composition comprising:

a) from about 10 to about 90 weight percent crystalline, isotactic propylene homopolymer having a molecular weight distribution of less than or equal to 3, and a weight average molecular weight from 25,000 to 1,500,000;

b) from about 90 to about 10 weight percent crystalline propylene copolymer having a molecular weight distribution of less tan about 3, wherein the weight percent of the comonomer based on the total weight of the polymer is in the range of from about 0.05 to about 8; and c) wherein the polymer composition is prepared with a catalyst system consisting essentially of one metallocene catalyst.

14. The fiber of claim 13, wherein the comonomer weight percent is in the range of from about 0.1 to about 10.0.

15. The fiber of claim 13, wherein the comonomer is selected from the group consisting of ethylene, 1-butene, 1-pentene, 1-hexene, and 1-octene.

16. The fiber of claim 13, wherein the weight percent of the crystalline propylene homopolymer is in the range of from about 20 to about 80.

17. The fiber of claim 1, wherein the metallocene catalyst system comprises is represented by the formula:

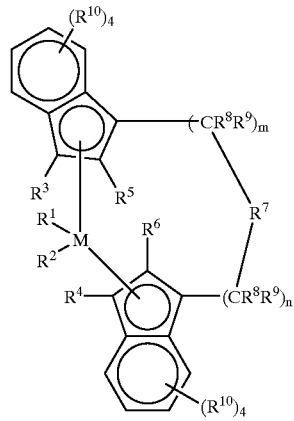

wherein M is selected from the group consisting of titanium, zirconium, hafnium, vanadium niobium, tantalum, chromium, molybdenum and tungsten;

$R^1$ and $R^2$ are identical or different, are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_2$–$C_4$ alkenyl group, a $C_7$–$C_{40}$ arylalkyl group, a $C_7$–$C_{40}$ alkylaryl group, a $C_8$–$C_{40}$ arylalkenyl group, or a halogen atom;

$R^3$ and $R^4$ are hydrogen atoms;

$R^5$ and $R^6$ are identical or different, and are one of a halogen atom, a $C_1$–$C_{10}$ alkyl group which may be halogenated, a $C_6$–$C_{10}$ aryl group which may be halogenated, a $C_2$–$C_{10}$ alkenyl group, a $C_7$–$C_{40}$ -arylalkyl group, a $C_7$–$C_{40}$ alkylaryl group, a $C_8$–$C_{40}$ arylalkenyl group, a -NR$_2^{15}$, -SR$^{15}$, -OR$^{15}$, -OSiR$_3^{15}$ or -PR$_2^{15}$ radical, wherein $R^{15}$ is one of a halogen atom, a $C_1$–$C_{10}$ alykl group, or a $C_6$–$C_{10}$ aryl group;

$R^7$ is

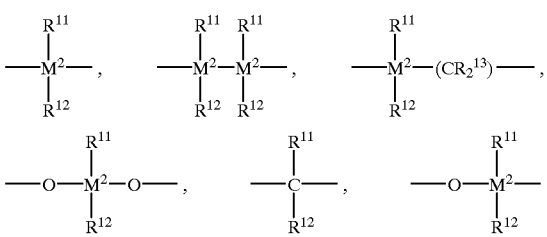

-B(R$^{11}$)-, -Al(R$^{11}$)-, -Ge-, -Sn-, -O-, -S-, -SO-, -SO$_2$-, -N(R$^{11}$)-, -CO-, -P(R$^{11}$)-, or -P(O)(R$^{11}$)-;

wherein, $R^{11}$, $R^{12}$ and $R^{13}$ are identical or different and are a hydrogen atom, a halogen atom, a $C_1$–$C_{20}$ alkyl group, a $_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{11}$ and $R^{12}$, or $R^{11}$ and $R^{13}$, together with the atoms binding them, form a ring system;

$M^2$ is silicon, germanium or tin;

$R^8$ and $R^9$ are identical or different and have the meanings stated for $R^{11}$;

m and n are identical or different and are zero, 1 or 2, m plus n being zero, 1 or 2; and the radicals $R^{10}$ are identical or different and have the meanings stated for $R^{11}$, $R^{12}$ and $R^{13}$.

18. The fiber of claim 6, wherein the metallocene catalyst system comprises is represented by the formula:

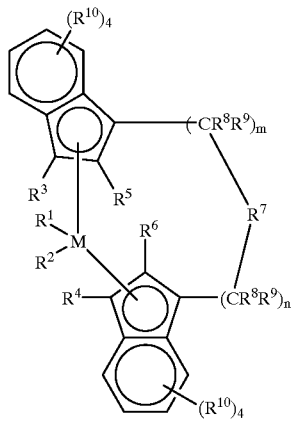

wherein M is selected from the group consisting of titanium, zirconium, hafnium, vanadium niobium, tantalum, chromium, molybdenum and tugnsten;

$R^1$ and $R^2$ are identical or different, are one of a hydrogen atom, a $C_1$–$C_{10}$ alkyl group, a $C_1$–$C_{10}$ alkyl group, a $C_6$–$C_{10}$ aryl group, a $C_6$–$C_{10}$ aryloxy group, a $C_2$–$C_{10}$ alkenyl group, a $C_2$–$C_4$ alkenyl group, a $C_7$–$C_{40}$ arylalkyl group, a $C_7$–$C_{40}$ alkylaryl group, a $C_8$–$C_{40}$ arylalkenyl group, or a halogen atom;

$R^3$ and $R^4$ are hydrogen atoms;

$R^5$ and $R^6$ are identical or different, and are one of a halogen atom, a $C_1$–$C_{10}$ alkyl group which may be halogenated, a $C_6$–$C_{10}$ aryl group which may be halogenated, a $C_2$–$C_{10}$ alkenyl group, a $C_7$–$C_{40}$-alkylaryl group, a $C_7$–$C_{40}$ alkylaryl group, a $C_8$–$C_{40}$ arylalkenyl group, a $-NR_2^{15}$, $-SR^{15}$, $-OR^{15}$, $-OSiR_3^{15}$ or $-PR_2^{15}$ radical, wherein $R^{15}$ is one of a halogen atom, a $C_1$–$C_{10}$ alkyl group, or a $C_6$–$C_{10}$ aryl group;

$R^7$ is

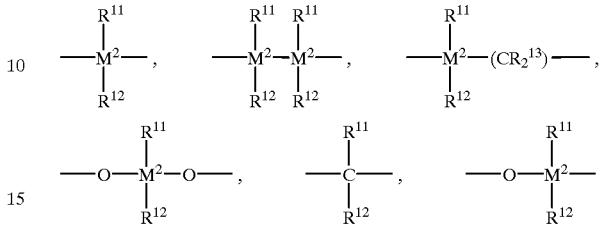

$-B(R^{11})-$, $-Al(^{11})-$, $-Ge-$, $-Sn-$, $-O-$, $-S-$, $-SO-$, $-SO_2-$, $-N(^{11})-$, $-CO-$, $=P(R^{11})-$, or $-P(O)(R^{11})-$;

wherein, $R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{11}$ and $R^{12}$, or $R^{11}$ and $R^{13}$, together with the atoms binding them, can form ring systems;

$M^2$ is silicon, germanium or tin; silicon;

$R^8$ and $R^9$ are identical or different and have the meanings stated for $R^{11}$;

m and n are identical or different and are zero, 1 or 2, m plus n being zero, 1 or 2; and the radicals $R^{10}$ are identical or different and have the meanings stated for $R^{11}$, $R^{12}$ and $R^{13}$.

* * * * *